United States Patent
Bicking

(10) Patent No.: US 7,391,204 B2
(45) Date of Patent: Jun. 24, 2008

(54) SENSOR SIGNAL CONDITIONING CIRCUIT

(75) Inventor: Robert E. Bicking, Freeport, IL (US)

(73) Assignee: Honrywell International Inc., Morristown, NJ (US)

(*) Notice: Subject to any disclaimer, the term of this patent is extended or adjusted under 35 U.S.C. 154(b) by 944 days.

(21) Appl. No.: 10/820,943

(22) Filed: Apr. 7, 2004

(65) Prior Publication Data
US 2005/0264435 A1 Dec. 1, 2005

(51) Int. Cl.
*G01R 33/04* (2006.01)
*G01R 33/12* (2006.01)

(52) U.S. Cl. .................. 324/207.21; 324/252; 324/225; 324/235; 327/341; 327/344

(58) Field of Classification Search .............. 324/252, 324/207.21, 225, 235; 327/344, 341
See application file for complete search history.

(56) References Cited

U.S. PATENT DOCUMENTS

| | | | |
|---|---|---|---|
| 5,455,510 A | 10/1995 | Nelson | 324/252 |
| 5,623,220 A | 4/1997 | Betti et al. | 327/79 |
| 6,252,395 B1 | 6/2001 | Aoyama et al. | |
| 6,297,628 B1 | 10/2001 | Bicking et al. | 324/207.21 |
| 6,657,476 B1 | 12/2003 | Bicking | 327/341 |
| 6,697,006 B1 | 2/2004 | McCartney et al. | 341/155 |
| 6,707,293 B2 | 3/2004 | Wan et al. | 324/207.25 |
| 2002/0190734 A1 | 12/2002 | Burt et al. | 324/713 |
| 2003/0117208 A1 | 6/2003 | Bicking | 327/513 |
| 2003/0184381 A1 | 10/2003 | Wyman et al. | 330/277 |

FOREIGN PATENT DOCUMENTS

EP 0370963 A1 5/1990

*Primary Examiner*—Reena Aurora
(74) *Attorney, Agent, or Firm*—Kermit D. Lopez; Luis M. Ortiz

(57) ABSTRACT

A sensor signal conditioning circuit and sensor system incorporating the same. In one embodiment, the signal conditioning circuit includes a DC-coupled detector that converts a sensor signal into a discrete level signal. An AC-coupled detector having a dynamic DC threshold input also converts the sensor signal into a discrete level signal and has a startup delay associated with the dynamic DC threshold input. The signal conditioning circuit further includes a device that inhibits the DC-coupled detector responsive to the dynamic DC threshold input reaching a specified threshold voltage level such that the AC-coupled detector provides the detected output during steady-state sensor operation.

22 Claims, 3 Drawing Sheets

SENSOR SIGNAL CONDITIONING CIRCUIT

TECHNICAL FIELD

Embodiments are generally related to sensor signal conditioning circuits, and more particularly to a signal conditioning circuit that enables AC coupling of a sensor output signal to a threshold detection device while eliminating startup delay. More particularly, embodiments are related to a magnetic sensor device employing switched mode comparator functionality, wherein a DC-coupled comparator initially detects sensor output during startup and an AC-coupled comparator is thereafter utilized for providing superior switching point offset characteristics.

BACKGROUND OF THE INVENTION

Voltage comparison circuits are used in many different applications that are well known to those skilled in the art. One application for voltage comparison circuits is to detect the sensed output voltage from a geartooth magnetic sensor that utilizes a plurality of magnetoresistors connected in a Wheatstone bridge arrangement. Typical MR bridge sensors employ four magnetoresistors arranged in a bridge configuration so that the voltage differential across the bridge is indicative of the presence or absence of a magnetic component, such as a geartooth, in a predefined detection zone proximate the geartooth sensor.

FIG. 1 is a high-level block diagram illustrating a conventional sensor system 10 such as may be utilized for geartooth or other magnetic sensing applications. Sensor system 10 generally comprises a magnetic signal sensor 2 having an output coupled to a signal conditioning module 4. Magnetic signal sensor 2, which may be a magnetoresistive (MR) bridge, a Hall effect device, or other non-contacting magnetic sensor, includes magnetically sensitive elements for detecting a varying magnetic field proximate to the sensor and translating the detected field into a real time differential voltage output representative of the relative position of the specified target. Signal conditioning module 4 receives the differential output from sensor 2 and includes circuit components and devices for translating the sensor signal into a suitable digital format that may be processed by a sensor microcontroller 12 to determine and provide control function signals related to the angular or linear motion of the specified target.

Signal conditioning module 4 includes a differential amplifier 6 that pre-amplifies the analog sensor signal, and a sensor output detector module 8, which digitizes the amplified signal. Detector module 8 typically includes comparator functionality for comparing the incoming amplified analog signal with one or more specified threshold levels to determine the digital switching points. Referring to FIG. 2A in conjunction with FIG. 1, a waveform representation of the amplifier output signal, $V_s$, is depicted in relation to the switching point thresholds employed by detector module 8. Ideally, and as illustrated in FIG. 2A, $V_s$ is centered at the 0 volts reference level to enable accurate signal detection.

The zero offset of the two different amplitude sine waves $V_{s1}$ and $V_{s2}$ cross at the same 0v reference points. Setting the switch points +SP and −SP closer to the 0v point, would minimize the switch point timing error resulting from the amplitude difference between $V_{s1}$ and $V_{s2}$. Even with switch points that are a substantial fraction of the signal amplitude as shown in FIG. 2A, the output signals from the detector $V_{out1}$ and $V_{out2}$ both have a 50% duty cycle and exhibit some phase shift. However, as shown in FIG. 2B, a DC offset is often imparted as on the depicted sensor signals $V_{s1}$ and $V_{s2}$ from a variety of sources including temperature and component calibration and tolerances of sensor 2 and amplifier 6.

In order to maintain the amplified signal in a detectable range to ensure reliable detector switching, the detector switch points +SP and −SP must have a sufficient range from the zero reference level to account for the DC offset. The DC offset may be of either polarity and often results from small mismatches in components which are designed to be as similar as possible such as the sensor bridge and input differential amplifier.

A problem relating to reliable switch point detection arises, however, when a DC offset is introduced in a reduced amplitude sensor signal. Namely, FIG. 2B illustrates a first signal, $V_{s1}$, representative of an expected amplitude signal, and a second signal, $V_{s2}$, representing a sensor signal that has been attenuated such as by an environment factor such as an increased air gap between the sensing element and target object. As seen in the depicted waveform comparison, a DC offset has been introduced that is large enough so that as $V_{s2}$ goes negative, the detector doesn't switch since the downward amplitude peak of $V_{s2}$ remains less than the offset added to the predetermined switch point. For smaller values of offset, switching will occur but the switching will move away from a 50% duty cycle as shown in FIG. 2B for $V_{out1}$.

By eliminating the DC offset, AC coupling of the sensor signal improves switch point detection reliability and reduces the need for a wider switch point span, thus enabling the switch points for detector module 8 to be set substantially near the ideal reference level. A variety of AC coupling techniques are known and are utilized in signal measuring and detection applications for enabling measurement of AC signals riding DC offset levels. The most common technique involves the use of a series coupled capacitor located between a signal input and the first amplification stage. The pre-amplification coupling can be necessitated in practice, in order to prevent the amplifier gain from disturbing the quiescent state of the AC coupling capacitor.

If signal gain was switched ahead of the coupling capacitor, the DC value applied to the capacitor would also change and the circuit would require a relatively long time to settle. Furthermore, a series AC coupling capacitor design is susceptible to stray electromagnetic interference (EMI) and non-linearities caused, for example, by the additional lead contacts required for the series coupled capacitor. These stray effects can degrade system performance by introducing RC time constants that limit the circuit's bandwidth or by introducing distortion components.

Given that a significant DC offset component may be imparted by the differential amplifier 6 as well as sensor 2, the pre-amplifier stage coupling requirement of an inline AC coupling capacitor renders this approach unsuitable for addressing the DC offset problems encountered by a conventional sensor system such as magnetic sensor system 10.

An alternative AC coupling technique employs a so-called DC buckout circuit. In a DC buckout circuit, a specified DC voltage is subtracted from the input signal, leaving a non-offset AC component. However, buckouts circuit performance is degraded by temperature drift of the subtraction voltage with temperature and other operating environment conditions, and drift of the DC component sought to be removed, both of which result in a remaining DC component.

An AC coupling technique well-suited to application within a magnetic sensor system such as magnetic sensor system 10 is disclosed in U.S. Pat. No. 6,657,476, the content of which is incorporated by reference herein in its entirety. The AC coupled sensor signal conditioning device disclosed in U.S. Pat. No. 6,657,476 utilizes a low-pass filter comprising a holding capacitor at the threshold input of a comparator device. While effective for eliminating the DC offset contributed by the sensor and the preamplifier, the AC-coupled conditioning circuit disclosed by U.S. Pat. No. 6,657,476 requires a significant startup time delay during which the holding capacitor initially charges. When implemented in a geartooth sensor, for example, such a startup delay may result in the sensor failing to track geartooth targets during system startup.

It would therefore be useful to address problems relating to DC offset in sensor signal conditioning circuits without compromising reliable sensor output during system startup. In view of the foregoing, a need remains for a sensor signal conditioning circuit that eliminates DC offset in the post amplification stage while maintaining an accurate and reliable sensor output tracking during system startup. The present invention addresses such a need.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

A sensor signal conditioning circuit and sensor system incorporating the same are disclosed herein. In one embodiment, the signal conditioning circuit includes a DC-coupled detector that converts a sensor signal into a discrete level signal. An AC-coupled detector having a dynamic DC threshold input also converts the sensor signal into a discrete level signal and has a startup delay associated with the dynamic DC threshold input. The signal conditioning circuit further includes a switch device that inhibits the DC-coupled detector responsive to the dynamic DC threshold input reaching a specified threshold voltage level such that the AC-coupled detector provides the detected output during steady-state sensor operation.

All objects, features, and advantages of the present invention will become apparent in the following detailed written description.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
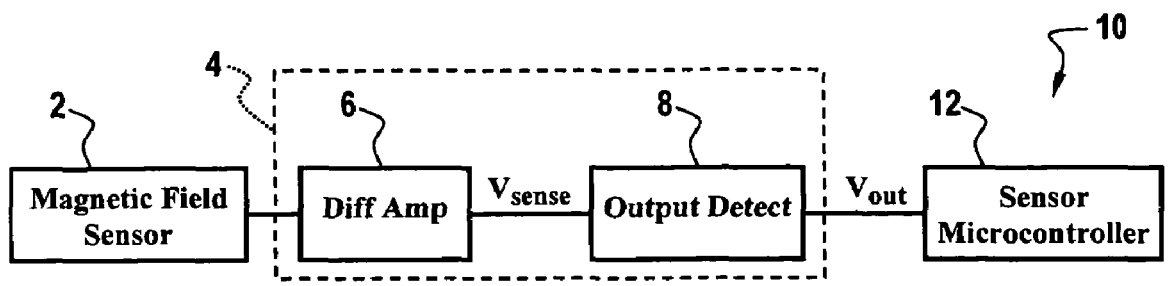
FIG. 1 is a high-level block diagram illustrating a conventional magnetic sensor system.
Figure 2A:
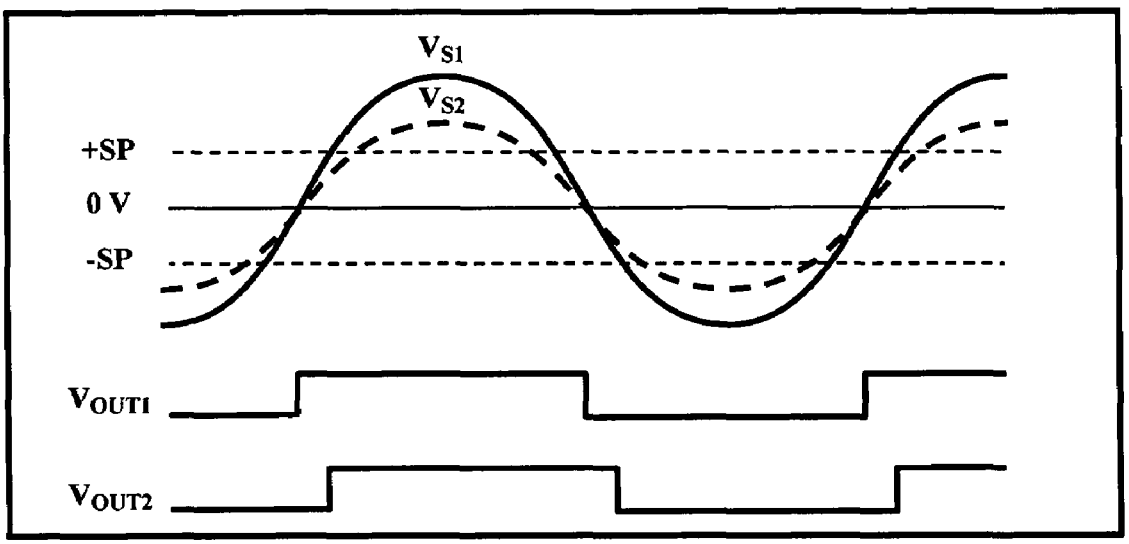
FIGS. 2A and 2B are signal diagrams depicting sensor signals generated by a magnetic sensor system.
Figure 2B:
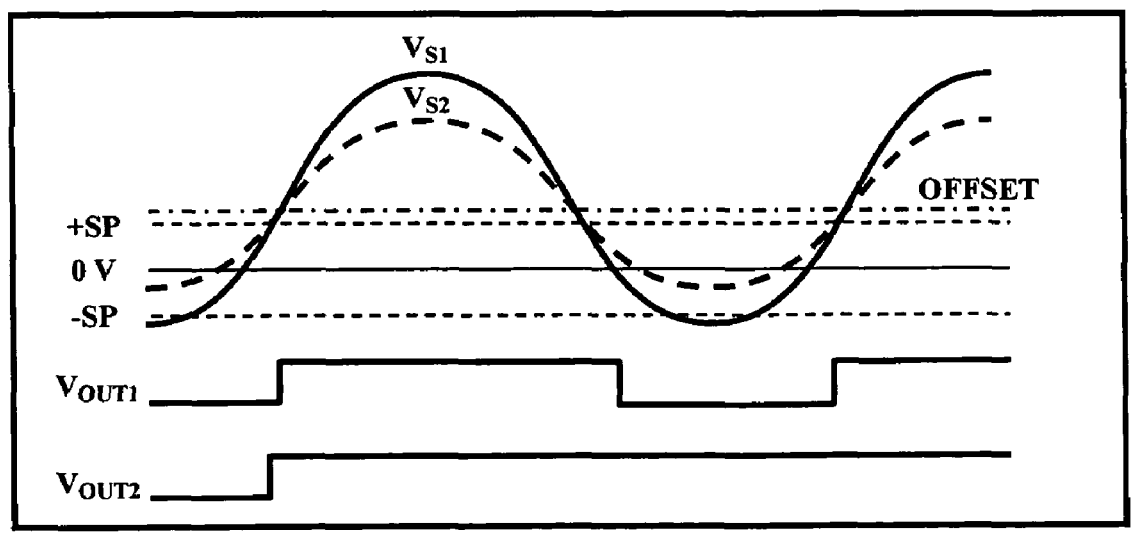

The present invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

Embodiments are generally directed toward a signal conditioning circuit that employs an AC-coupling technique in order to substantially eliminate DC offset of a typically amplified analog sensor output signal. In a preferred embodiment, near zero DC offset of the sensor signal can be accomplished, enabling the detector/comparator switch points to be set as near the zero reference. The reduced switch point span results in substantially reduced switch point error when sensor output signal amplitude is altered such as by variations in sensor-to-magnetic element air gap. The present invention further includes a selectively disabled DC-coupling feature for addressing AC-coupling problems relating to a start-up delay experienced such as by capacitive elements of the AC-coupling feature.

As explained in further detail below with reference to the figures, the present invention may be embodied as a signal conditioning device or sensor system incorporating the same. In one embodiment, the signal conditioning device of the present invention comprises an AC-coupled and a DC-coupled detector. As utilized herein the term "detector" is used to designate an integrated device or assembly of electronic components designed to convert an input analog signal into a "detected" discrete level (i.e. digitized) signal. The detection function is typically accomplished as a voltage comparison such as may be accomplished by the use of a comparator and associated circuit components.

The AC-coupled detector of the present invention preferably operates in accordance with the principles set forth in U.S. Pat. No. 6,657,476, issued to the present inventor, and incorporated herein by reference in its entirety. In particular, the AC-coupled detector employs a comparator having a dynamically adaptable DC threshold to which a sensor signal input is compared. The dynamic DC threshold is preferably generated by an RC filter including one or more capacitive elements and having a characteristic capacitive charge up time to achieve a baseline DC level.

This charge up period occurs during initial activation period of the sensor and accounts for a start-up delay in signal conditioning response of a sensor system such as a magnetoresistive (MR) or Hall Effect sensor system utilized to track rotating targets such as gearteeth. As explained in further detail below with reference to the figures, the presently disclosed signal conditioning device further includes a DC-coupled detector device that also receives the sensor signal and also functions to convert the sensor signal to a discrete level signal. A switching device is utilized to selectively inhibit the DC-coupled detector after a specified startup delay such that the AC-coupled detector provides the detected signal free of DC-offset during steady-state sensor system operation.

Figure 3:
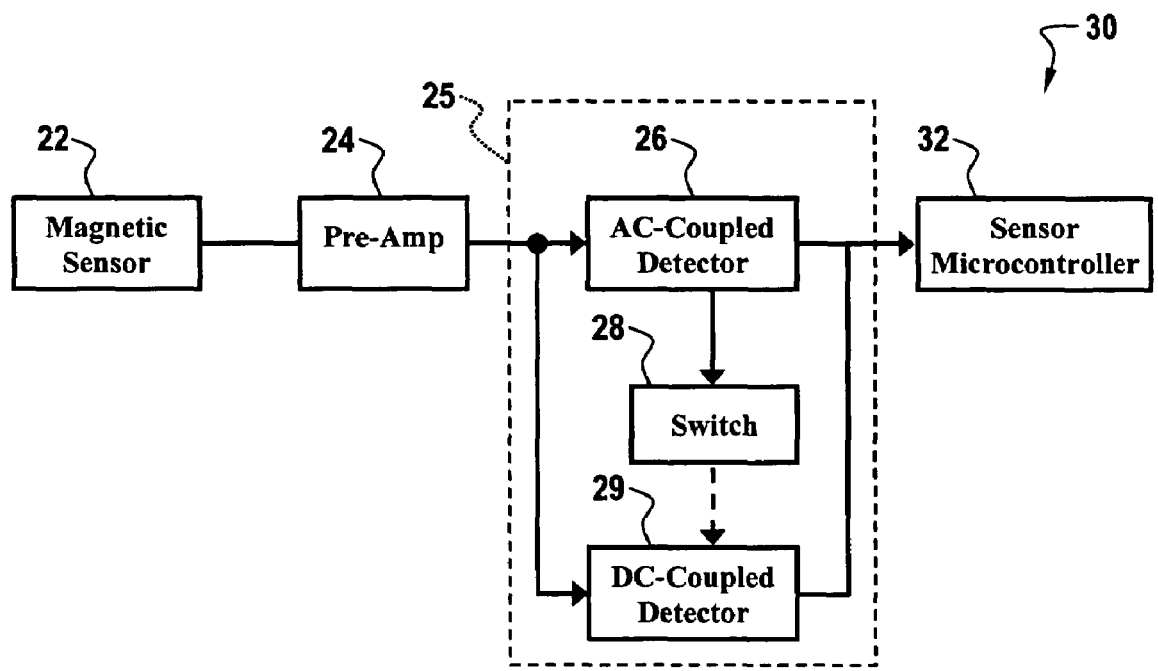
FIG. 3 is a block diagram illustrating a magnetic sensor system incorporating a switched DC-coupled comparator in accordance with the present invention.

With reference now to the figures, wherein like reference numerals refer to like and corresponding parts throughout, and in particular with reference to FIG. 3, there is depicted a block diagram illustrating a magnetic sensor system 30 incorporating a switched DC-coupled comparator in accordance with the present invention. Specifically, and as shown in FIG. 3, sensor system 30 generally comprises a pre-amplifier 24 and switched-mode detector 25 for processing the output sensor signal from a magnetic sensor 22, resulting in a digitized sensor signal output used by a sensor microcontroller 32 such as in an automotive feedback control system. Magnetic sensor 22 generally comprises a non-contacting sensor device for detecting the relative position and motion of a specified target object such as the rotation of a shaft. Many types of such magnetic sensor types are known in the art including anisotropic magnetoresistive (AMR), giant magnetoresistive (GMR), Hall Effect sensors, etc.

Assuming a differential analog output signal from sensor 22, pre-amplifier 24 provides an amplified signal to the input of switched-mode detector 25. Using single or dual ended peak voltage comparison techniques, switched-mode detector 25 detects the occurrence of positive and negative peak intervals (sometimes referred to as max and min values) and translates the alternating peaks into corresponding discrete level signals. To this end, and as well known in the art, switched-mode detector 25 includes comparator functionality that compares the incoming amplified sensor signal with one or more threshold signal levels to accurately detect when switch points are reached, resulting in the object comparator switching outputs in a rail-to-rail manner.

In order to accurately track when the incoming sensor signal reaches the switch points, the sensor signal input to switched-mode detector 25 is ideally a centered at a prespecified reference voltage level, typically 0 VDC. In practice, however, the amplified sensor signal often includes a substantial and varying DC offset caused by a variety of factors including the component manufacturing and calibration tolerances of sensor 22 and pre-amplifier 24. As previously explained herein, the DC offset degrades switch point detection accuracy particularly given the amplitude fluctuations of the sensor signal.

To address the DC offset problem, switched-mode detector 25 includes an AC-coupled detector 26, preferably comprising the AC-coupled comparator functionality described in U.S. Pat. No. 6,657,476. The design of AC-coupled detector 26 enables post-amplification AC coupling resulting in highly accurate switch point detection. In a preferred embodiment, and as depicted in further detail with reference to U.S. Pat. No. 6,657,476 and FIG. 5 herein, AC-coupled detector 26 compares the amplified sensor signal from pre-amplifier 24 with a dynamic DC threshold input voltage that is adaptively set to effectively filter low frequency components caused by a variable DC offset, resulting in an overall high-pass filter configuration.

While effective for removing DC offset imparted by the sensor and amplification stages, AC-coupled detector 26 includes capacitive elements requiring a charge-up period at the initialization of the sensing and detection process. In some applications, such as geartooth sense applications, this capacitive charge-up period results in a detection delay at sensor startup that may result, for example, in the detector missing geartooth targets at system startup.

To address the start-up delay problem, and as depicted in FIG. 3, switched-mode detector 25 further comprises a DC-coupled detector 29 that concurrently receives the amplified sensor signal input from pre-amplifier 24. DC-coupled detector 29 compares the incoming signal with a static DC threshold input (not depicted in FIG. 3) without significant capacitive charge-up delay. In this manner, DC-coupled detector 29 provides the detected output from switched-mode detector 25 during the startup delay experienced by AC-coupled detector 26. An exemplary DC-coupled detector such as may be implemented in switched-mode detector 25 is depicted and described in U.S. Pat. No. 5,455,510.

To capitalize on the superior steady-state tracking performance of AC-coupled detector 26, switched-mode detector 25 further comprises a switch device 28 for adaptively switching the detector output from DC-coupled to AC-coupled. As explained and depicted in further detail with reference to FIG. 5, switch 28 preferably includes circuit means for inhibiting DC-coupled detector 29 after a specified startup delay substantially corresponding to the charge-up period experienced by AC-coupled detector 26. The selectively switched, dual coupling mode operation of detector 25 thus provides superior steady-state tracking accuracy while eliminating startup delay that would otherwise result from the AC-coupled detection.

Figure 4:
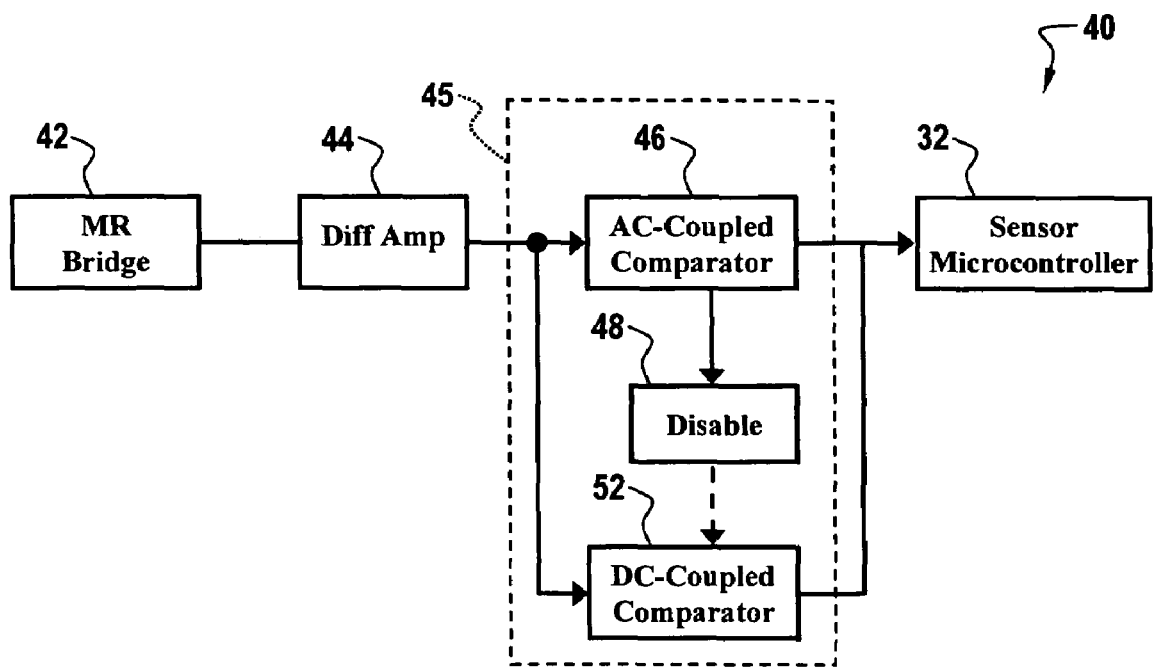
FIG. 4 is a block diagram depicting a magnetic sensor system incorporating a dynamically switched DC-coupled comparator in accordance with a preferred embodiment of the present invention.

Referring now to FIG. 4, there is illustrated a block diagram depicting a magnetic sensor system 40 incorporating a dynamically switched DC-coupled comparator in accordance with a preferred embodiment of the present invention. The high-level design of sensor system 40 is similar to sensor system 30, and more specifically, comprises a differential amplifier 44 coupled receiving a differential sensor output from an MR bridge sensor 42. Similar to detector 25, a switched-mode detector 45 includes an AC-coupled detector 46 and a DC-coupled detector 52, each receiving the amplified sensor signal from amplifier 44.

In the preferred embodiment depicted in FIG. 4, a disable device 48 effectively performs a DC-coupling inhibit function analogous to switching function of switch device 28. More specifically, and as depicted in further detail in FIG. 5, disable device 48 receives a sense input from AC-coupled detector 46 that preferably provides an indication of the aforementioned charge-up state of the detector. Responsive to the sense input from AC-coupled detector 46 reaching a specified threshold level, disable device 48 generates an inhibit signal applied to an input of DC-coupled comparator 52. In this manner, the detector output applied from switched-mode detector 40 to a sensor microcontroller 32 switches from a DC-coupled mode during sensor system startup to an AC-coupled mode during steady-state operation.

Figure 5:
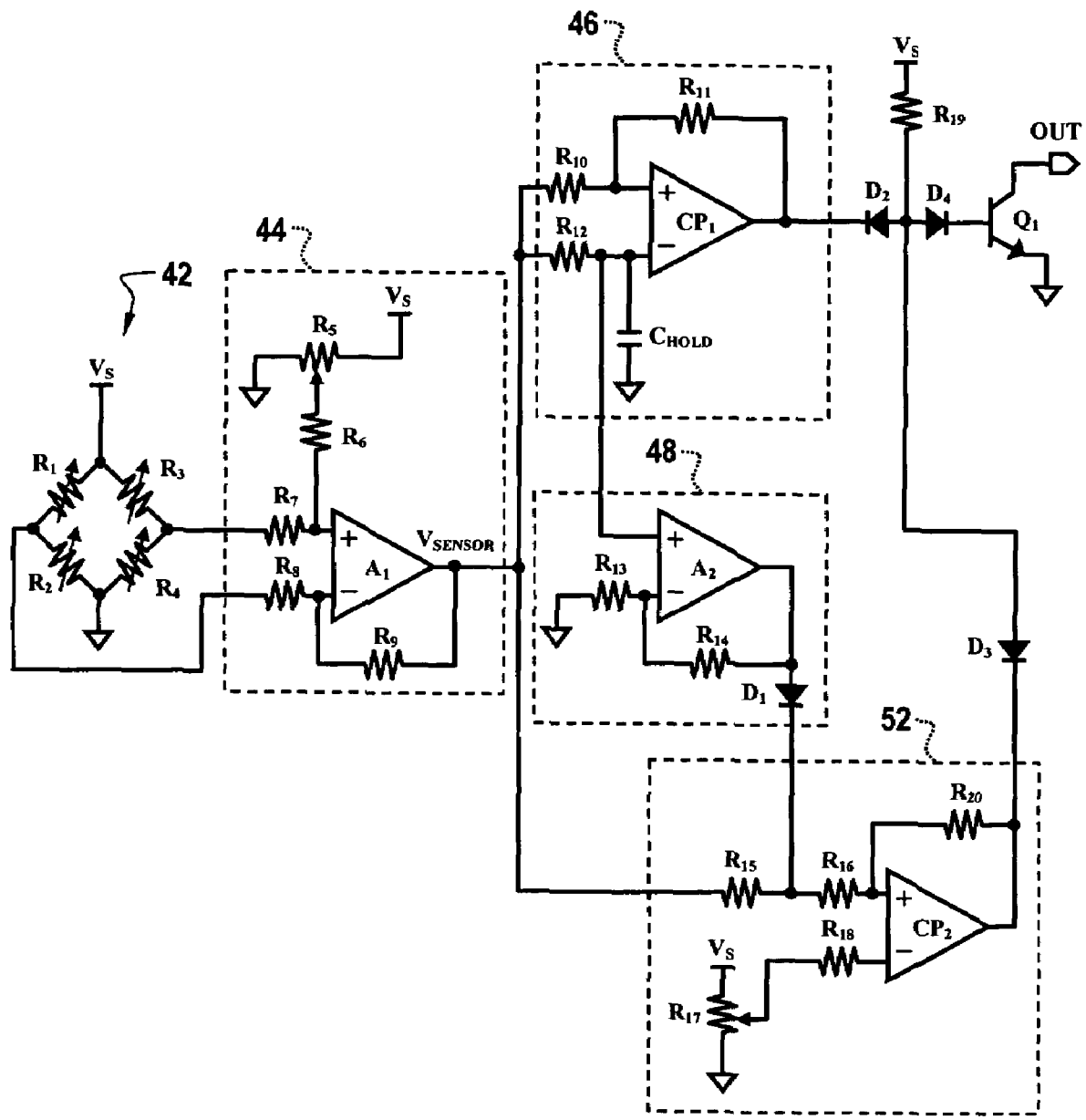
FIG. 5 is a circuit diagram illustrating in simplified component-level detail the preferred dynamically switched DC-comparator as incorporated in the magnetic sensor system shown in FIG. 4.

With reference to FIG. 5, there is depicted a circuit diagram illustrating, in simplified component-level detail, the preferred dynamically switched DC-comparator as incorporated in the magnetic sensor system shown in FIG. 4. As shown in FIG. 5, MR sensor 42 comprises MR elements R1 through R4 configured as a Wheatstone bridge and having a differential sensor output applied to the input terminals of differential amplifier 44. As further depicted, differential amplifier 44 comprises an op-amp $A_1$ receiving one sense input at its inverting terminal to which input resistor $R_8$ and feedback resistor $R_9$ are coupled. The other sense input is received at the non-inverting terminal with input resistor $R_7$ and offset adjust resistor $R_6$ and potentiometer $R_5$ coupled thereto. While the depicted embodiment employs a differential amplifier, other possible pre-amplifier designs such as instrumentation amplifiers and the like may be utilized to amplifier a magnetic sensor signal without departing from the spirit or scope of the present invention.

The amplified sensor signal, $V_{sensor}$, from the output of differential amplifier 44 is simultaneously received as input to both AC-coupled detector 46 and DC-coupled detector 52. In accordance with the depicted embodiment, AC-coupled detector 46 generally comprises a comparator $CP_1$ and associated input and feedback resistors $R_{10}$, $R_{12}$ and $R_{11}$, together performing an analog-to-digital function for converting the incoming analog sensor signal into a detected, discrete level signal. Preferably, $CP_1$, and the resistance values of $R_{10}$, $R_{12}$ and $R_{11}$ are selected to provide a hysteresis of 1.25 mV. Assuming a voltage gain of 10 from differential amplifier 44, the effective hysteresis through AC-coupled detector 46 would therefore be approximately 0.125 mV.

As further depicted in FIG. 5, a low-pass filter comprising $R_{12}$ and $C_{hold}$ is coupled between the sensor signal input and the inverting input terminal of comparator $CP_1$. In a preferred embodiment, the values of $R_{12}$ and $C_{hold}$ are 1.0 Mohm and 1.0 microfarad, respectively, or are otherwise selected such that the low-pass filter has a cutoff frequency selected based on the lowest frequency at which accurate signal detection is desired. For a single tooth target, for example, a rotation speed of 1 revolution per second yields a 1 Hz waveform. In accordance with the Nyquist sampling theorem, a 0.5 Hz sampling frequency is needed to accurately determine the 1 Hz frequency.

To accurately determine slope or rate of change, however, a lower frequency of approximately 0.16 Hz can be utilized as the cutoff frequency achieved by the depicted 1.0 Mohm resistor and 1.0 microfarad capacitor. As explained in further detail in U.S. Pat. No. 6,657,476, the low-pass filter generates a dynamic DC threshold input that adaptively follows low frequency components of the incoming amplified sensor signal. The sensor signal is applied through input resistor $R_{10}$ to the non-inverting terminal and compared with the dynamic DC threshold input at the inverting terminal causing comparator $CP_1$ to switch accordingly. In this manner, comparator $CP_1$ is effectively configured to detect only the non-DC offset, high-pass sensor signal resulting in a detected output in which the DC-offset from bridge sensor 42 and differential amplifier 44 has been removed. Positive feedback resistor $R_{11}$ assures that the output of the comparator will swing quickly and completely from maximum output to minimum output (i.e. "rail-to-rail").

DC-coupled detector 52 also includes a comparator $CP_2$ having a feedback resistor $R_{20}$ for assuring fast switching rail-to-rail detected output, an input voltage divider comprising resistors $R_{15}$ and $R_{16}$ coupled to the non-inverting input terminal, and a static DC threshold voltage divider comprising resistor $R_{18}$ and potentiometer $R_{17}$ coupled to the inverting terminal. Configured in this manner, DC-coupled detector 52 compares a sensor signal input at its non-inverting terminal with the static threshold voltage level at its inverting terminal to produce a discrete level output corresponding to the sensor signal. Comparator $CP_2$ is a typical DC-coupled comparator having a hysteresis of 25 mV for an effective amplified hysteresis of 2.5.

Coupled to the outputs of both AC-coupled detector 46 and DC-coupled detector 52 is a diode "OR" gate comprising diodes $D_2$ and $D_3$ that selectively enable one or the other of the detector outputs to drive an open-collector output transistor $Q_1$ from which the signal is output from the depicted signal conditioning circuit.

The signal conditioning circuit further includes a disable device 48 that inhibits the DC-coupled detector 52 responsive to the dynamic DC threshold input to comparator $CP_1$ reaching a specified voltage level. As shown in the depicted embodiment, disable device 48 preferably comprises an amplifier $A_2$ having a non-inverting input coupled to the dynamic DC threshold input of comparator $CP_1$ and input and feedback resistors $R_{13}$ and $R_{14}$ coupled to the inverting input terminal. Initially, $D_1$ is reverse-biased and doesn't inhibit switching of $CP_2$.

As $C_{hold}$ charges up, the output of $A_2$ increases to a value that inhibits comparator $CP_2$ from switching due to the bias provided through diode $D_1$. As explained above, AC-coupled detector 46 experiences a startup delay due to the charge-up time of the capacitive element, $C_{hold}$. With disable 48 implemented as shown in FIG. 5, the non-inverting input of amplifier $A_2$ senses the dynamic threshold level and switches $A_2$ on when a suitable threshold level has been reached. The switched output from $A_2$ is applied through diode $D_1$ to the non-inverting input of comparator $CP_2$, thus inhibiting comparator $CP_2$ from further output switching during steady-state operation of the signal conditioning circuit. The net effect is for $A_2$ to keep $CP_2$ from switching when $C_{hold}$ has charged and AC-coupled detector 46 commences signal detection. In the foregoing manner, the present invention addresses problems relating to DC offset in sensor signal conditioning circuits without compromising reliable sensor output during system startup. The sensor signal conditioning circuit of the present invention eliminates DC offset in the post amplification stage while maintaining an accurate and reliable sensor output tracking during system startup.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

Having thus described the invention what is claimed is:

1. A sensor output signal conditioning circuit comprising:
   a DC-coupled detector that converts a sensor signal into a digitized signal;
   an AC-coupled detector that converts the sensor signal into a digitized signal, wherein said AC-coupled detector includes a dynamic DC threshold input voltage that is adaptively set to effectively filter low frequency components caused by a variable DC offset; and
   a disable device that inhibits the DC-coupled detector responsive to the dynamic DC threshold input reaching a specified threshold voltage level.

2. The sensor output signal conditioning circuit of claim 1, further comprising an amplifier coupled between a magnetic sensor and said AC-coupled and DC-coupled detectors, wherein said amplifier amplifies a sensor signal from the magnetic sensor to produce an amplified sensor signal applied as inputs to said AC-coupled and DC-coupled detectors.

3. The sensor output signal conditioning circuit of claim 1, wherein said AC-coupled detector exhibits high-pass filter characteristics with respect to the sensor signal.

4. The sensor output signal conditioning circuit of claim 1, wherein said AC-coupled detector is a voltage comparator that compares a sensor signal input with the dynamic DC threshold input.

5. The sensor output signal conditioning circuit of claim 1, wherein said DC-coupled detector is a comparator that compares a sensor signal input with a static DC threshold input.

6. The sensor output signal conditioning circuit of claim 5, wherein said disable device produces an inhibit signal for inhibiting switching of the DC-coupled detector comparator.

7. The sensor output signal conditioning circuit of claim 6, wherein said disable device is an amplifier that senses the voltage level at the dynamic DC threshold input and generates the inhibit signal responsive to the sensed voltage level reaching a specified threshold.

8. The sensor output signal conditioning circuit of claim 7, wherein said disable device amplifier comprises:
   a sense input coupled to the dynamic DC threshold input; and
   an output coupled to the sensor signal input line of said DC-coupled detector.

9. The sensor output signal conditioning circuit of claim 1, further comprising a dynamic DC threshold generator for producing the dynamic DC threshold input.

10. The sensor output signal conditioning circuit of claim 9, wherein said dynamic DC threshold generator comprises a low-pass filter.

11. The sensor output signal conditioning circuit of claim 10, wherein said low-pass filter has a cutoff frequency of approximately 0.16 Hz.

12. The sensor output signal conditioning circuit of claim 11, wherein said low-pass filter comprises:
   a resistor coupled between an analog sensor signal input and the dynamic DC threshold input of said AC-coupled detector; and
   a capacitor coupled between the dynamic DC threshold input and ground.

13. The sensor output signal conditioning circuit of claim 12, wherein said resistor is approximately 1.0 Mega-ohm and said capacitor is approximately 1.0 microfarad.

14. A sensor output signal conditioning device comprising:
   an amplifier that amplifies a sensor output signal; and
   a switched-mode detector having a DC-coupled output mode wherein a DC-coupled detector converts the amplified sensor output signal into a digitized signal that is output from said switched-mode detector, said switched mode detector further having an AC-coupled output mode wherein an AC-coupled detector converts the amplified sensor output signal into a digitized signal that is output from said switched-mode detector, wherein the output of said switched-mode detector switches from the DC-coupled output mode to the AC-coupled output mode responsive to a startup delayed threshold input reaching a specified voltage level.

15. The sensor output signal conditioning device of claim 14, wherein said startup delayed threshold input is the threshold input of said AC-coupled detector.

16. A signal conditioning circuit for converting a sensor signal into a digitized output signal, said signal conditioning circuit comprising:
   a DC-coupled detector for converting the sensor signal into a digitized signal output from the signal conditioning circuit;
   an AC-coupled detector for converting the sensor signal into a digitized signal output from the signal conditioning circuit; and
   a device that selectively inhibits the digitized output from said DC-coupled detector after a specified startup delay substantially corresponding to a charge-up period experienced by said AC-coupled detector.

17. The signal conditioning circuit of claim 16, wherein said DC-coupled detector comprises a voltage comparator.

18. The signal conditioning circuit of claim 17, wherein said DC-coupled detector voltage comparator includes a sensor signal input and a static DC threshold input.

19. The signal conditioning circuit of claim 17, wherein said device generates an inhibit signal that inhibits switching of said DC-coupled detector voltage comparator.

20. The signal conditioning circuit of claim 16, wherein said AC-coupled detector includes a sensor signal input and a dynamic DC threshold input, said AC-coupled detector comparing the sensor signal received at the sensor signal input with the threshold voltage level at the dynamic DC threshold input.

21. The signal conditioning circuit of claim 20, wherein said AC-coupled detector comprises a voltage comparator receiving the sensor signal at the sensor signal input and receiving the threshold voltage level at the dynamic DC threshold input.

22. The signal conditioning circuit of claim 21, wherein said AC-coupled detector further comprises a low-pass filter coupled to the dynamic DC threshold input.

* * * * *